(12) United States Patent
Pinel et al.

(10) Patent No.: US 9,290,714 B2
(45) Date of Patent: Mar. 22, 2016

(54) GALLING-RESISTANT THREADED TUBULAR COMPONENT AND PROCESS FOR COATING SAID COMPONENT

(75) Inventors: Eliette Pinel, Sainte-Euphemie (FR); Eric Gard, Genay (FR)

(73) Assignees: VALLOUREC OIL AND GAS FRANCE, Aulnoye-Aymeries (FR); SUMITOMO METAL INDUSTRIES, Ltd., Osaka-shi (JP)

( * ) Notice: Subject to any disclaimer, the term of this patent is extended or adjusted under 35 U.S.C. 154(b) by 0 days.

(21) Appl. No.: 13/395,823

(22) PCT Filed: Sep. 21, 2010

(86) PCT No.: PCT/EP2010/005763
§ 371 (c)(1), (2), (4) Date: Mar. 13, 2012

(87) PCT Pub. No.: WO2011/038850
PCT Pub. Date: Apr. 7, 2011

(65) Prior Publication Data
US 2012/0169048 A1    Jul. 5, 2012

(30) Foreign Application Priority Data
Sep. 30, 2009    (FR) ...................................... 09 04659

(51) Int. Cl.
*B05D 1/18* (2006.01)
*C10M 103/06* (2006.01)
(Continued)

(52) U.S. Cl.
CPC ............ *C10M 103/06* (2013.01); *F16L 15/004* (2013.01); *F16L 58/182* (2013.01); *C10M 2201/041* (2013.01); *C10M 2201/062* (2013.01);
(Continued)

(58) Field of Classification Search
USPC ....................................... 427/376.4
See application file for complete search history.

(56) References Cited

U.S. PATENT DOCUMENTS 3,450,578 A * 6/1969 Hans et al. .................... 428/336
3,869,894 A * 3/1975 Meyer et al. ...................... 72/42
(Continued)

FOREIGN PATENT DOCUMENTS

FR     2 892 174     4/2007
FR     2 914 926     10/2008
(Continued)

OTHER PUBLICATIONS

International Search Report issued on Jan. 25, 2011 in PCT/EP10/005763 filed on Sep. 21, 2010.
(Continued)

*Primary Examiner* — Nathan Empie
(74) *Attorney, Agent, or Firm* — Oblon, McClelland, Maier & Neustadt, L.L.P.

(57) ABSTRACT

A galling-resistant threaded tubular component for drilling or operating hydrocarbon wells includes at one of its ends a threaded zone produced on its external or internal peripheral surface depending on whether the threaded end is male or female in type, with at least one portion of the threaded zone being coated with a dry film with a crystalline structure with a high specific surface area principally constituted by one or more mineral salts which are not reactive towards metals, and a process for coating such a component using a dry mineral film with a crystalline structure having a high specific surface area principally constituted by one or more mineral salts which are not reactive towards metals.

18 Claims, 3 Drawing Sheets

(51) Int. Cl.
*F16L 58/18* (2006.01)
*F16L 15/00* (2006.01)

(52) U.S. Cl.
CPC ... *C10M 2201/085* (2013.01); *C10M 2201/102* (2013.01); *C10M 2201/105* (2013.01); *C10N 2230/06* (2013.01); *C10N 2230/12* (2013.01); *Y10T 428/13* (2015.01)

(56) References Cited

U.S. PATENT DOCUMENTS

| | | | | |
|---|---|---|---|---|
| 5,224,266 | A * | 7/1993 | Gratt | 29/888.061 |
| 6,509,099 | B1 * | 1/2003 | Urata et al. | 428/423.1 |
| 2003/0066641 | A1 * | 4/2003 | Yamamoto et al. | 166/242.6 |
| 2003/0159764 | A1 * | 8/2003 | Goto | 148/519 |
| 2003/0160446 | A1 * | 8/2003 | Goto | C10M 103/02 285/94 |
| 2004/0195825 | A1 * | 10/2004 | Anraku et al. | 285/94 |
| 2005/0181137 | A1 * | 8/2005 | Straus | 427/376.2 |
| 2006/0228505 | A1 * | 10/2006 | Goto et al. | 428/36.9 |
| 2009/0220780 | A1 | 9/2009 | Bordet et al. | |
| 2010/0167968 | A1 | 7/2010 | Pinel et al. | |
| 2010/0201119 | A1 | 8/2010 | Bordet et al. | |

FOREIGN PATENT DOCUMENTS

| | | |
|---|---|---|
| WO | 2006 104251 | 10/2006 |
| WO | 2008 125740 | 10/2008 |
| WO | 2010 043316 | 4/2010 |

OTHER PUBLICATIONS

U.S. Appl. No. 13/700,744, filed Nov. 29, 2012, Gard et al.
U.S. Appl. No. 13/884,717, filed May 10, 2013, Gard et al.
U.S. Appl. No. 13/824,812, filed Mar. 18, 2013, Gard et al.
U.S. Appl. No. 14/348,711, filed Mar. 31, 2014, Gard et al.
U.S. Appl. No. 14/316,351, Jun. 26, 2014, Bordet et al.

* cited by examiner

GALLING-RESISTANT THREADED TUBULAR COMPONENT AND PROCESS FOR COATING SAID COMPONENT

The present invention relates to a galling-resistant tubular component used for drilling and operating hydrocarbon wells, and more precisely to the threaded end of such a component, said end being of the male or female type and capable of being connected to a corresponding end of another component to form a connection. The invention also relates to a threaded connection resulting from joining two tubular components by makeup. The invention also relates to a process for coating such a galling-resistant tubular component.

A component which is "used for drilling and operating hydrocarbon wells" means any element that is substantially tubular in form intended to be connected to another element of the same type or otherwise to finally constitute either a string for drilling a hydrocarbon well or a riser intended for maintenance such as work-over risers, or for operation, such as production risers, or for a casing string or tubing string used in operating wells. The invention is also applicable to components used in a drill string, such as drill pipes, heavy weight drill pipes, drill collars and the portions of pipe connections and heavy weight pipes known as tool joints.

Each tubular component comprises one end provided with a male threaded zone and/or one end provided with a female threaded zone each intended to be connected by makeup with the corresponding end of another component, the assembly defining a connection.

Threaded tubular components are connected under defined stresses in order to satisfy the requirements for a secure fit and seal imposed by the service conditions. Depending on the types of alloys used for the connections, the stresses may vary in severity and nature. Carbon steel alloys are somewhat vulnerable as regards their corrosion behaviour in general but on the other hand exhibit more favourable frictional behaviour. Stainless steel alloys, in contrast, exhibit more critical behaviour but have very good corrosion resistance. It should be noted that in wells, the threaded tubular components may have to undergo several makeup-breakout cycles. Makeup operations are generally carried out under high axial load, for example the weight of a tube several metres in length to be connected by the threaded connection, which may be localized by a slight misalignment of the axis of the threaded elements to be connected; this induces a risk of galling at the threaded zones and at the metal/metal sealing surfaces.

Various solutions intended to lubricate the threaded zones have been implemented.

Traditionally, in order to protect the threaded zones against galling during makeup-breakout operations, they are stripped of grease which protects against corrosion and coats of special makeup grease such as grease in accordance with American Petroleum Institute standards API Bul 5A2 or 5A3. However, in addition to the disadvantage of requiring a supplementary coating operation to be carried out on-site, the use of such greases, loaded with heavy and/or toxic metals such as lead, suffers from the disadvantage of causing pollution of the wells and of the environment, the excess grease being ejected from the threadings during makeup.

Further advances in accordance with environmental standards have consisted in designing a "dry" product which solves most of the problems linked to using API type greases. Thus, dry lubricants of the thermosetting film type have provided an ecologically viable, high performance solution.

Viscoplastic type systems have also been developed in order to achieve even better performances.

Other solutions using several layers have also been developed, with the principal aim being to dispense with the use of greases.

For carbon steels, phosphatation type treatments have been developed, such as zinc phosphatation, manganese phosphatation, or mixed phosphatation. Those treatments consist of a chemical attack of the steel, leading to the formation of a highly adhesive crystalline layer which provides enhanced protection against corrosion. The morphology of such layers is also favourable to better adhesion of the coatings as well as to better retention of the lubricating systems.

That type of surface treatment, however, suffers from the disadvantage of not being applicable to chromium steels. It also suffers from disadvantages on an industrial scale, in that it is difficult to control the technical parameters (possible homogeneity problems) and in that the industrial facilities must be managed carefully, in particular as regards the treatment of effluents.

Oxalation type surface treatments, based on attack of the surface with oxalic acid, and used for steels, suffers from disadvantages in that environmental issues are more pronounced than those mentioned previously for phosphatation.

Solutions using the modification of surfaces by mechanical action, such as shot blasting, sand blasting and any other impact process have also been used. However, the performances observed are poor.

Metallization processes have been employed. They consist of an adhesive deposit of alloys of various natures such as copper or ternary alloys. Those types of processes were designed to allow better adhesion of the lubricating layer, to produce at the interface a sacrificial layer contributing to improving the frictional properties, and/or possibly to constitute a protection of the surface against corrosion. Surface metallization processes, already used in processes for hot deformation of aeronautical alloys and used for threaded tubular components, are essentially based on electrochemical deposits. That process suffers from the disadvantage of high production costs and being difficult to control as regards reproducibility and homogeneity of the performances.

Other processes, such as sherardization and other derivative processes, use metallic diffusion. That type of process is industrially unwieldy and expensive and causes problems with the treatment of effluents because of the presence of zinc on the surface.

For these reasons, the invention proposes a solution which enables to overcome the problem of sensitivity of the threaded zones of tubular components as regards galling, this solution furthermore being simple and inexpensive to industrialize as well as being environmentally friendly.

In particular, the invention concerns the production of a coating for a metallic surface adapted to the performance requirements demanded by the operations of makeup and breakout of tube connections used in operating geothermal wells, and in particular hydrocarbon wells. This coating is intended to allow adhesion and to enhance the performances of lubricating systems deposited on the threadings of said connections, over current systems which are currently commercially available or which have been developed in this field. This coating may also be functional without complementary lubricating systems.

More particularly, an increase in the performances and a reduction in production costs are achieved compared with surface preparation techniques in current use.

Furthermore, the chemical nature of the metallic substrate is conserved in that a superficial crystalline deposit is produced which is adhesive and not chemically reactive towards the treated surface.

Applications to any type of alloy used in drilling and oil production may be envisaged, in particular to steels, regardless of their grade. It may be of particular interest to stainless steels.

More precisely, a coating process is provided for a galling-resistant threaded tubular component for drilling or operating hydrocarbon wells. Said tubular component has at one of its ends a threaded zone produced on its external or internal peripheral surface depending on whether the threaded end is male or female in type. The process comprises the following steps:

dissolving one or more mineral salts which are not reactive towards the metals in a solvent;

depositing the solution obtained thereby on at least a portion of the threaded zone;

evaporating off said solvent in order to obtain a dry film having a crystalline mineral structure having a high specific surface area.

Optional features, which are complementary or substitutional, are defined below.

The specific surface area of the dry film having a crystalline mineral structure may be more than 20 $m^2/g$, preferably more than 100 $m^2/g$.

The solution may result from dissolving an alkaline silicate in water.

The solution may result from dissolving a metallic phosphate in an acid.

The solution may be deposited by spraying.

The solution may be deposited by dipping.

The threaded zone may be heated to between 50° C. and 250° C. before depositing the solution.

The threaded zone may be heated to between 50° C. and 300° C. after depositing the solution.

The solution may be deposited at a temperature slightly below its boiling point.

Before depositing it, the solution may be supplemented with an anticorrosion agent.

Before depositing it, the solution may be supplemented with dispersed particles of solid lubricant(s), said particles of solid lubricant(s) comprising particles of lubricants from at least one of classes 1, 2, 3 and 4. Reference should be made to patent application FR-2 892 174 which is hereby incorporated by reference.

Before depositing it, the solution may be supplemented with a braking additive constituted by dispersions of mineral or organic particles which have a relatively high cleavage load value and/or strong particulate interactions or attractive bonds between particles and/or a medium to high Mohs hardness and/or a rheological behaviour which is resistant to or opposes movement, each braking additive being selected from a group comprising at least bismuth oxide, titanium oxide, colloidal silica and carbon black. Reference in this respect should be made to patent application FR-2 914 926 which is hereby incorporated by reference.

Before depositing it, the solution may be supplemented with nanometric mineral particles (alumina, silica, TiN) in order to increase the frictional strength of the film by adjusting the coefficient of friction.

Before depositing it, the solution may be supplemented with fullerene particles in order to increase the frictional strength of the film by reducing the coefficient of friction.

Before depositing it, the solution may be supplemented with an organic dispersion or emulsion.

The threaded zone may be coated with a lubricating system once the film is formed.

The lubricating system coating the threaded zone may be a hot-melt polymer.

A galling-resistant threaded tubular component for drilling or operating geothermal wells has at one of its ends a threaded zone produced on its external or internal peripheral surface depending on whether the threaded end is male or female in type. At least one portion of the threaded zone is coated with a dry film with a crystalline structure having a high specific surface area principally constituted by one or more mineral salts which are not reactive towards metals.

Optional features, which are complementary or substitutional, are defined below.

The specific surface area of the dry film having a crystalline mineral structure may be more than 20 $m^2/g$, preferably more than 100 $m^2/g$.

The film may be principally constituted by alkaline silicate.

The film may be principally constituted by metallic phosphate.

The film may comprise an anticorrosion agent.

The film may comprise dispersed particles of solid lubricant(s), said particles of solid lubricant(s) comprising particles of lubricants from at least one of classes 1, 2, 3 and 4.

The film may comprise a braking additive constituted by dispersions of mineral or organic particles which have a relatively high cleavage load value and/or strong particulate interactions or attractive bonds between particles and/or a medium to high Mohs hardness and/or a rheological behaviour which is resistant to or opposes movement, each braking additive being selected from a group comprising at least bismuth oxide, titanium oxide, colloidal silica and carbon black.

The film may comprise nanometric mineral particles of the alumina, silica, TiN type in order to increase the frictional strength of the film by adjusting the coefficient of friction.

The film may comprise particles of fullerenes in order to increase the frictional resistance of the film by reducing the coefficient of friction.

The film may comprise organic compounds in order to increase the yield strength of the film.

The threaded zone coated with film may be coated with a lubricating system.

The lubricating system coating the threaded zone may be a hot-melt polymer.

A threaded tubular connection comprises a male threaded tubular component and a female threaded tubular component made up one into the other. At least one of said threaded tubular components is in accordance with one of the embodiments described above.

The features and advantages of the invention will be described in more detail in the description which follows, made with reference to the accompanying drawings.

Figure 1:
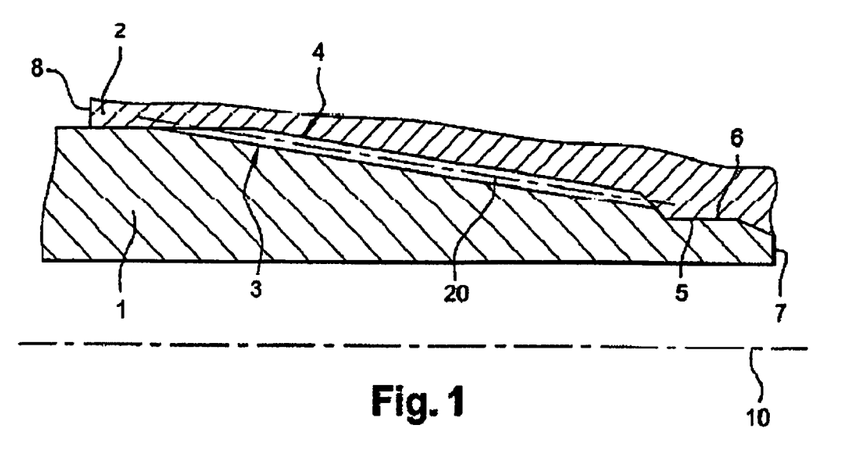
FIG. 1 is a diagrammatic view of a connection resulting from connecting two tubular components by makeup.

The threaded connection shown in FIG. 1 comprises a first tubular component with an axis of revolution 10 provided with a male end 1 and a second tubular component with an axis of revolution 10 provided with a female end 2. The two ends 1 and 2 finish respectively in a terminal surface 7, 8 orientated radially with respect to the axis 10 of the threaded connection and are respectively provided with threaded zones 3 and 4 which cooperate mutually for mutual connection by makeup of the two components. The threaded zones 3 and 4 are conventional in that they may be of the trapezoidal, self-locking, etc thread type. Furthermore, metal/metal sealing surfaces intended to come into tight sealing contact against each other after connecting the two threaded components by makeup are shown at 5 and 6 between the threaded zones 3, 4 and the terminal surface 7 of the male end 1.

At least one of the threaded tubular components is coated on at least a portion of the threaded zone 3; 4 with a dry mineral film principally constituted by one or more mineral salts which are not reactive towards the metals. The term "principally constituted by one or more mineral salts" means that the chemical composition of the film is based on a mineral salt or on a mixture of mineral salts and that it may also include other compounds which are thus involved as additives.

The dry character of the film implies that it is not (or is only slightly) contact-adhesive (tacky to the touch), which has the advantage of not trapping dust from the environment in which it is used, and so it does not contaminate surfaces with which it comes into contact. Thus, it differs from greases in conventional use which suffer from the disadvantage that they pollute the environment by migration, run-out or extrusion during makeup/breakout.

The Applicant recommends a process for producing a mineral film which involves a step for dissolving a compound constituted principally by mineral salts in a solvent, then a step for depositing the solution obtained thereby on at least a portion of the threaded zone, and finally by evaporating off said solvent in order to obtain a mineral film with a crystalline structure.

More precisely, the process is based on constituting a dry film with a crystalline structure principally constituted by mineral salts which are not reactive towards metals. The chemical nature of the film is thus not reactive towards the metallic surface of the tubular component in that it does not alter, and thus it maintains the chemical structure of the metallic surface of the tubular component. There are substantially no covalent type chemical bonds between the film and the metallic surface of the tubular component.

Further, the mineral film has very interesting properties in that its crystalline structure has a high specific surface area. The term "crystalline structure with a high specific surface area" means that the structure is crystalline and that its actual surface area is much higher than its apparent surface area. In other words, it is expected that the developed surface of the film is such that it constitutes a particularly extended surface. Conventionally, the specific surface area can be quantified using the Brunauer, Emett and Teller (BET) measurement process in units of surface area per unit mass, i.e. square metres per gram.

More precisely, the term "high specific surface area" means that the film must have a specific surface area of at least several tens of $m^2/g$ and that it is in particular more than 20 $m^2/g$. By way of indication, zirconium oxides with a partially crystalline tetragonal structure (10-30 nm) have a BET specific surface area which is relatively high, generally in the range 30 $m^2/g$ to 120 $m^2/g$. Also by way of indication, zinc, with a hexagonal crystalline structure, has a low BET specific surface area of 8 $m^2/g$ for a lamellar structure and 0.25 $m^2/g$ for a spherical structure.

The particularly extensive surface area of the developed surface of the film is explained by the fact that it is formed by a process of crystalline germination commencing from atomic structures of the substrate which are produced during evaporation of the solvent. A crystalline macrostructure is obtained which develops a very large surface area. For this reason, the film has a very high surface energy which results in a large capacity to adhere on one side facing its substrate, and on the other side to retain a lubricant film. In other words, the process of producing the film plays the leading role in obtaining the crystalline macrostructure with a high specific surface area. It is in fact necessary to the process for constructing the layer to induce as many germination sites as possible which lead to crystallization.

Figure 3:
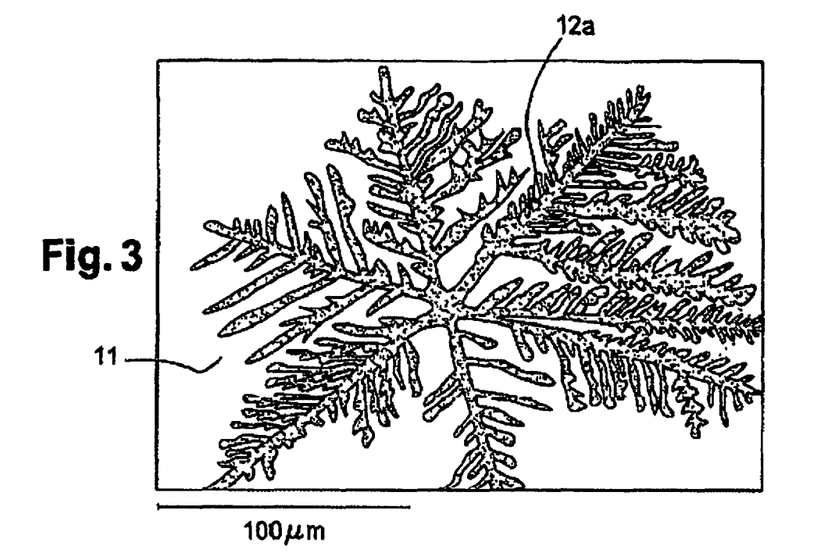
FIG. 3 is a highly detailed view of the threaded surface of a tubular component in accordance with one embodiment of the invention.
Figure 4:
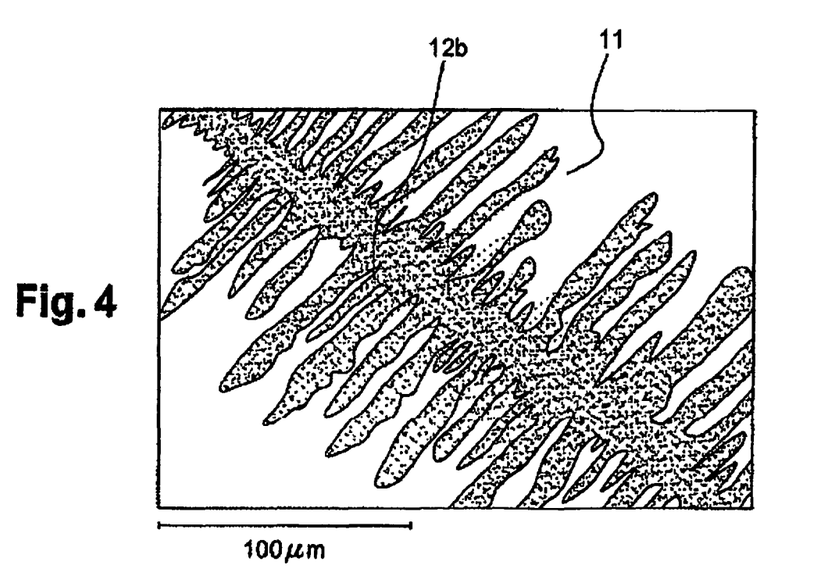
FIG. 4 is a highly detailed view of the threaded surface of a tubular component in accordance with another embodiment of the invention.

These types of crystalline macrostructures may be in the form of needles 12*b* or dendrites 12*a* as shown in FIGS. 3 and 4 which represent a top view of a metallic surface 11 on which germination of these crystalline macrostructures has taken place. The crystals from the germination are strongly bound to the threaded zones via chemical or polar Van der Waals type bonds.

The strong adhesion of the mineral film also enables to retain any lubricant used as a complement over the film. For this reason, the morphology of the film, which is directly linked to the presence of macrostructures in the form of needles 12*b* or dendrites 12*a*, encourages the hydrodynamic or elasto-hydrodynamic regime or viscoplastic regime under friction.

Further, the morphology of the film contributes to improving and stabilizing the film effect. The term "film effect" as used in tribology means the capacity of a film including solid particles to carry out a true treatment of the solid surface on the frictional substrate, also termed the transfer layer or third body. More precisely, this transfer layer, constituted by particles of the mineral film arising from friction, reinforces the properties of the film in terms of shear strength. It also means that high frictional performances can be obtained over long frictional distances or in the case of the high friction occurring during makeup and breakout of the threaded tubular connections.

Thus, the Applicant has studied the production of non-reactive mineral films with a crystalline structure having a high specific surface area exhibiting acceptable performances and having the possibility of simple and inexpensive industrialization. The detailed modes below also take into account the facility with which crystalline germination occurs.

In accordance with one embodiment, salts based on alkaline silicates which are soluble in water, such as Vicafil TS 915® sold by Condat, Traxit ZEL 510® or Traxit ZEL 590® sold by Traxit International, may be used. These alkaline silicates enable to develop very high specific surface areas in the range 650 to 800 $m^2/g$, more particularly 720 $m^2/g$ for a sodium silicate.

In accordance with another embodiment, it is possible to use salts based on metallic phosphates which are soluble in acid. As an example, it is possible to use aluminum or manganese phosphates dissolved in phosphoric acid at a pH of 2. In this case, the acidity is used for the purpose of dissolving the mineral salt. A crystalline film of metallic phosphates is formed which is bonded to the substrate via bonds which are principally polar or Van der Waals bonds and substantially not by covalent bonds. There is no chemical modification of the surface of the substrate as is the case in a conventional phosphatation treatment using a carbon steel substrate in which, in contrast, the substrate undergoes chemical modifications. The metallic phosphates can then develop specific surface areas in the range 100 to 200 $m^2/g$.

In the two embodiments which are described, namely salts based on alkaline silicates and metallic phosphates, a specific surface area of more than 100 $m^2/g$ is obtained.

Advantageously, the threaded zone intended to receive the deposit may be preheated to between 50° C. and 250° C. Thus, it is recommended that the substrate be preheated to 200° C. when using solutions resulting in particular in the dissolution of aluminum phosphates in phosphoric acid and when using certain low solubility compounds.

Advantageously, the solution is deposited by dipping or spraying. These deposition modes have the advantage of being very simple and inexpensive.

Advantageously, once coated the substrate is heated to between 50° C. and 350° C. in order to accelerate evaporation of the solvent as well as germination of the mineral film.

Similarly, for the same purpose, the solution is deposited at a temperature which is slightly lower than its boiling point.

It should be noted that the parameters for producing the film influence the crystalline growth modes and thus the crystalline network. The parameters may be adjusted in order to obtain an equilibrium between the acicular and dendritic crystalline growth modes, which result in a rather porous crystalline network, and an epitaxial crystalline growth mode, which results in a denser crystalline network.

Advantageously, the solution may be supplemented with various agents which can improve the mechanical properties of the mineral film or its corrosion resistance.

Thus, emulsions or organic dispersions such as a mixture with acrylic and styrene/acrylic copolymer, may be added to provide the film with better flexibility and elasticity.

Regarding corrosion resistance, the solution may be supplemented with corrosion inhibitors. It will be recalled that the term "corrosion inhibitor" means an additive which provides the film developed on the substrate with the capacity to protect it by a chemical, electrochemical or physico-chemical mechanism. Corrosion inhibitors may be metallic phosphates, lamellar metals or even organic systems.

Lamellar metals primarily include zinc, aluminum, copper, brass, and iron oxides. Their lamellar structure means that compared with a spherical structure, they can offer a much larger specific surface area for exchange, in particular by two-dimensional contact with the binder and also with the surface to be protected, as well as meaning that diffusion of electrolytes participating in the corrosion mechanism is much more difficult. This is the case, for example, with lamellar zinc which has a specific surface area which is 32 times higher than zinc dust which has a spherical structure.

A larger specific surface area thus results in greater absorption of binder (i.e. the solution described above) to the surface of the pigment, enabling formulations with a low pigment volume concentration (PVC), which is favorable as regards the application and the properties of the film, in particular anticorrosion protection. Thus, in addition to protection from cathodic corrosion induced by the high conductivity between the zinc and the steel, lamellar zinc also offers an excellent barrier effect.

In contrast to pigments with a spherical structure, the anticorrosion protection is more efficient for lower concentrations of pigment with a lamellar structure and the advantages as regards the film may result in greater flexibility, better adhesion to the interface, and low porosity and permeability. Similarly, the risk of sedimentation is lower and the formulation is more homogeneous. The skilled person is directed to the document by C Gidice: "Zinc-rich epoxy primers based on lamellar zinc dust", Surface Coatings International, Part B: Coatings Transactions (1997), vol 80, number 6, for further details.

It should be noted that metallic pigments are subject to corrosion especially in aqueous solution. In alkaline media, lamellar aluminum or zinc pigments react by liberating hydrogen, while the reaction with copper or brass is followed by the absorption of oxygen. The liberated hydrogen as well as the absorption of oxygen may be deleterious. However, adding 2,4-dinitrophenol can prevent the various corrosive reactions and the intrinsic properties of the pigments may thus be preserved. More details can be obtained by reference to the document by B Muller: "Corrosion inhibition of metallic pigments by nitrophenols", Surface Coatings International Part B: Coatings Transactions (2000), vol 83, number 1.

Similarly, the solution may be supplemented with solid lubricant which is in dispersion in the solution. The term "solid lubricant" as used here means a solid and stable body which on being interposed between two frictional surfaces enable to reduce the coefficient of friction and reduce wear and damage to the surfaces. These bodies can be classified into different categories defined by their functional mechanism and their structure, namely:

class 1: solid bodies owing their lubricant properties to their crystalline structure, for example graphite, zinc oxide (ZnO) or boron nitride (BN);

class 2: solid bodies owing their lubricant properties to their crystalline structure and also to a reactive chemical element in their composition, for example molybdenum disulphide $MoS_2$, graphite fluoride, tin sulphides, bismuth sulphides, tungsten disulphide, or calcium fluoride;

class 3: solid bodies owing their lubricant properties to their chemical reactivity, for example certain chemical compounds of the thiosulphate type, or Desilube 88® sold by Desilube Technologies Inc;

class 4: solid bodies owing their lubricant properties to a plastic or viscoplastic behaviour under frictional stresses, for example polytetrafluoroethylene (PTFE) or polyamides.

The particular category of fullerenes should also be noted; they fall into a sub-category of class 1. It will be recalled that fullerenes are molecules with a spherical or tubular shape, with a monolayer or multilayered structure, with properties of reducing friction and generating stable transfer films on the frictional surfaces. In particular, for example, it is possible to use carbon fullerenes or metallic disulphide type fullerenes.

It is also possible to recommend the combined use of at least two solid lubricants belonging to different classes, which enables to obtain synergistic effects, thereby producing very high lubrication performances.

Advantageously, the solution and thus in the end the mineral film, may be supplemented with one or more braking additives intended to enhance the coefficient of friction of the film in order to be compatible with a higher final makeup torque, while conserving an effecient tightening guaranteeing the seal of the threaded connection. It will be understood that each braking additive is selected as a function of the specific physical properties enabling to provide the composition with a capacity to "brake" the movement applied during makeup in the lubricated regime as a function of the makeup torque profile for the threaded tubular connection, and thus of the mode of production of the latter.

Braking additives are conventionally constituted by dispersions of mineral or organic particles which have a relatively high cleavage load value and/or strong particulate interactions or attractive bonds between particles and/or a medium to high Mohs hardness and/or a rheological behaviour which resists or opposes movement, each braking additive being selected from a group comprising at least bismuth oxide, titanium oxide, colloidal silica and carbon black.

Advantageously, the solution, and thus in the end the mineral film, may be supplemented with nanometric mineral particles (alumina, silica, TiN) in order to increase the frictional resistance of the film. More particularly, these nanometric particles enable to adjust the coefficient of friction of the film and improve the constitution of the transfer layers or third frictional bodies.

In order to reinforce—if needed—the galling resistance of the threaded zone, it is possible to coat it with a lubricating system, once the mineral film has been formed.

There is no limitation in the choice of the lubricating system which can be used over the film. It may equally be a conventional grease or a dry, non-tacky lubricant coating of the hot-melt type, for example, or another, knowing that adhesion of hot-melt type coatings is optimized because of the high specific surface area of the film. The term "hot-melt coating" means any hot-melt polymer coating. Examples of this type of coating have been described in the document FR-2 892 174 which is hereby incorporated by reference.

Regarding the tribological results relating to films, the Applicant carried out friction tests using a Bridgman type machine. This type of machine has in particular been described in the article by D Kuhlmann-Wilsdorf et al, "Plastic flow between Bridgman anvils under high pressures", J Mater Res, vol 6, no 12, December 1991.

Figure 5:
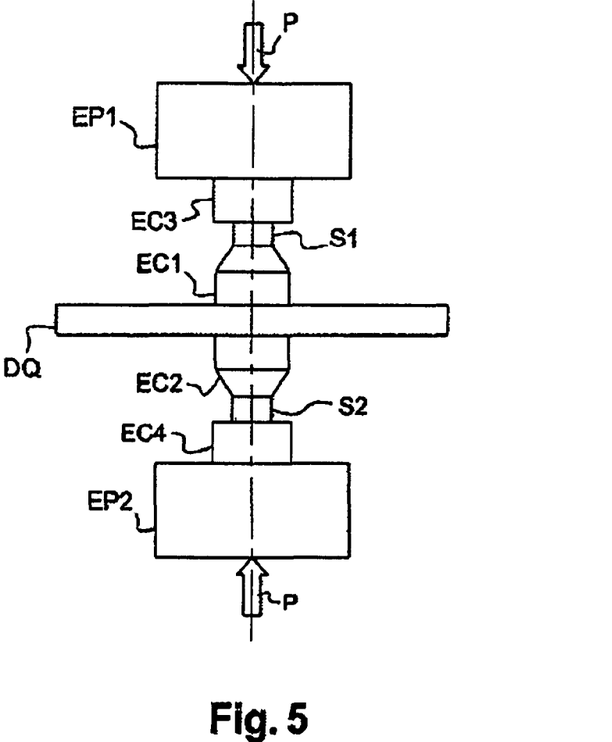
FIG. 5 is a diagrammatic view of a test facility.

A diagrammatic and functional example of a Bridgman machine is illustrated in FIG. 5. This machine comprises:
  a disk DQ which can be driven in rotation at selected speeds;
  a first anvil EC1, preferably conical in type, strongly fixed to a first face of the disk DQ;
  a second anvil EC2, preferably conical in type, strongly fixed to a second face of the disk DQ, opposite its first face;
  first EP1 and second EP2 pressure elements, such as pistons, for example, which can exert the selected axial pressures P;
  a third anvil EC3, preferably cylindrical in type, which is strongly fixed to one face of the first pressure element EP1;
  a fourth anvil EC4, preferably cylindrical in type, which is strongly fixed to one face of the second pressure element EP2.

To test a lubricant composition, two pieces of a material identical to that constituting a threaded element are covered with said composition in order to form the first S1 and second S2 specimens. Next, the first specimen S1 is interposed between the free faces of the first EC1 and third EC3 anvils, and the second specimen S2 between the free faces of the second EC2 and fourth EC4 anvils. Next, the disk DQ is rotated at a selected speed while applying a selected axial pressure P (for example of the order of 1.5 GPa) with each of the first EP1 and second EP2 pressure elements, and the makeup torque to which each specimen S1, S2 is subjected is measured.

The axial pressure, the rotation speed and the angle of rotation are selected in the Bridgman test to simulate the Hertz pressure and the relative speed of the abutment surfaces at the end of makeup.

Using such a machine, it is possible to fix several different pairings (makeup torque, rotation speed) in order to impose predetermined makeup torques on specimens S1 and S2, and thus to check whether these specimens S1 and S2 closely follow a given makeup torque profile, and in particular whether they can reach a number of completed turns before galling which is at least equal to a threshold value selected with respect to the selected makeup torques.

In the present case the selected contact pressure was 500 MPa and the rotation speed was 10 rpm. The test specimens were formed from stainless steel with 13% Cr, machined then coated with different formulations for the dry films with a crystalline mineral structure and a high specific surface area, the films themselves being coated with a lubricant coating of the viscoplastic polymer type. The composition of the lubricating coating was as follows:

| | |
|---|---|
| Polyethylene sold by CLARIANT under the trade name PE 520 | 19% |
| Carnauba wax | 15% |
| Zinc stearate | 20% |
| PAMA sold by ROHMAX under the trade name VISCOPLEX 6-950 | 5% |
| Calcium sulphonate derivative sold by LUBRIZOL under the trade name ALOX 2211Y | 30% |
| Graphite fluoride | 7% |
| Polytetrafluoroethylene | 2% |
| Boron nitride | 1% |
| Dye (quinizarine green $C_{28}H_{22}N_2O_2$) | 0.5% |
| Antioxidants sold by Ciba-Geigy: | |
| IRGANOX ® L150 | 0.3% |
| IRGAFOS ® 168 | 0.2% |

The table below shows that the films described above can allow a number of turns before galling which is much higher than the number of turns made when the specimens are coated with lubricant coating of the viscoplastic polymer type alone.

In the table below, the ratio P/L designates the weight ratio between the additives and the solvent.

| Type of film | Mode of application | Number of turns |
|---|---|---|
| No mineral film | — | 5 |
| Vicafil TS915 ® | Dip at 95° C. | 87 |
| Aluminium phosphate in solution in phosphoric acid | Spray onto substrate at 200° C. | 195 |
| Sodium silicates (Si—Na) | Spray onto substrate at 120° C. | 21 |
| Si—Na + class 4 (PE/EBS) with (P/L = 0.25) | Spray onto substrate at 120° C. | 53 |
| Si—Na + class 2 ($Bi_2S_3$) with (P/L = 0.25) | Spray onto substrate at 120° C. | 118 |
| Si—Na + class 2 ($Bi_2S_3$) with (P/L = 1) | Spray onto substrate at 120° C. | 170 |
| Si—Na + class 2 ($Bi_2S_3$) with (P/L = 2) | Spray onto substrate at 120° C. | 48 |
| Si—Na + class 2 ($Bi_2S_3$) + reinforcement (nano $Al_2O_3$). Powder ratio (90/10) with (P/L = 1.5) | Spray onto substrate at 120° C. | 105 |
| Si—Na + class 2 ($Bi_2S_3$) + reinforcement (carbon black). Powder ratio (90/10) with (P/L = 1) | Spray onto substrate at 120° C. | 115 |
| Si—Na + class 2 ($Bi_2S_3$) + class 4 (PE/EBS). Powder ratio (90/10) with (P/L = 1) | Spray onto substrate at 120° C. | 93 |
| Si—Na + class 2 ($Bi_2S_3$) + class 4 (PE/EBS). Powder ratio (90/10) with (P/L = 2) | Spray onto substrate at 120° C. | 105 |

The Applicant also carried out actual makeup-breakout tests using tubular components corresponding to the VAM TOP® product. The makeup operations were carried out following the profile described in FIG. 2, expressing the makeup (tightening) torque as a function of the number of rotations made.

Figure 2:
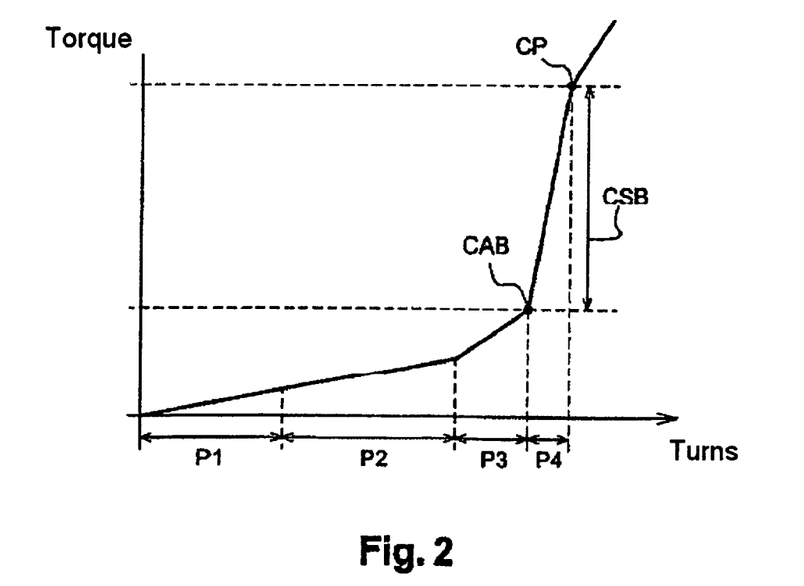
FIG. 2 is a diagrammatic view of a makeup curve of two threaded tubular components.

As can be seen, a profile for the makeup torque of "premium" connections can be broken down into four steps. In a first step P1, the external threads of the male threaded element (or pin) of a first component of a threaded tubular connection have not yet any radial tightening with the internal threads of the corresponding female threaded element (or box) of a second component of the same threaded tubular connection.

In a second step P2, the geometrical interference of the threads of the male and female threaded elements generates a radial tightening which increases as makeup continues (generating a small but increasing makeup torque).

In a third step P3, a sealing surface at the external periphery of the end portion of the male threaded element interferes radially with a corresponding sealing surface of the female threaded element to produce a metal/metal seal.

In a fourth step P4, the front end surface of the male threaded element is in axial abutment with the annular surface of a makeup abutment of the female threaded element. This fourth step P4 corresponds to the terminal phase of makeup. The makeup torque CAB which corresponds to the end of the third step P3 and to the start of the fourth step P4 is termed the shouldering torque. The makeup torque CP which corresponds to the end of the fourth step P4 is termed the plastification torque.

Beyond this plastification torque CP, it is assumed that the male makeup abutment (end portion of the male threaded element) and/or the female makeup abutment (zone located behind the annular abutment surface of the female threaded element) is subjected to plastic deformation, which may degrade performance as regards the tightness of the contact between the sealing surfaces by plastification of the sealing surfaces as well. The difference between the values for the plastification torque CP and the shouldering torque CAB is termed the torque on shoulder resistance CSB (CSB=CP−CAB).

A threaded tubular connection is subjected to optimized tightening at the end of makeup, which is a guarantee of the optimized mechanical behaviour of the threaded connection, for example to tensile forces but also to accidental breakout during service, and of optimized sealing performance. The designer of a threaded connection thus has to define, for each given type of threaded connection, a value for the optimized makeup torque which must, for all connections of this type of connection, be lower than the plastification torque CP (to avoid plastification of the abutments and the resulting disadvantages) and higher than the shouldering torque CAB.

Ending makeup with a torque less than CAB cannot guarantee correct relative positioning of the male and female elements and thus of an efficient tightening between their sealing surfaces. Furthermore, there is a risk of breakout. The effective value of the shouldering torque CAB fluctuates greatly from one connection to another for the same type of connection as it depends on the effective diameters of the threads and the male and female sealing surface(s), and the optimized makeup torque should be substantially higher than the shouldering torque CAB. As a consequence, the higher the value of the torque on shoulder resistance CSB, the larger the margin for defining the optimized makeup torque, and the stronger the threaded connection will be to operational stresses.

Makeup-breakout tests were carried out on a VAM TOP® connection with an external diameter of 88.9 mm (i.e. 3½″) and a thickness of 6.45 mm (i.e. 9.2 lb/ft) and with L80 13 Cr grade steel coated with a mineral film of the Vicafil TS910® type with a plastification torque CP of 3930 N.m. The film had been applied to both the male threaded end and to the female threaded end and a dry coating of hot-melt polymer of the same type as that used for the Bridgman test was used as a top coat, i.e. over the mineral film. No galling was observed after 15 turns followed each time by breakout.

Thus, it appears that these dry films with a crystalline mineral structure having a high specific surface area as well as the deposition processes associated therewith constitute a powerful treatment, particularly for threaded tubular components formed from stainless steel.

Further, the application of dry films with a crystalline mineral structure having a high specific surface area is advantageously not limited to the application to the threaded zones 3, 4 of the connections used for drilling or operating hydrocarbon wells. Good results in terms of galling resistance have been obtained when such films have been applied to the sealing zones 5, 6 of connections of components used in operating hydrocarbon wells other than for drilling. These sealing surfaces are intended to come into tightening sealing contact with each other after coupling the two threaded components by makeup, the tightening contact between the sealing surfaces 5, 6 having Hertz stresses of the same order as those found in the threaded zones 3, 4.

The invention claimed is:

1. A process for coating a galling-resistant steel tubular component made of one or more metals for drilling or operating hydrocarbon wells, the tubular component including at an end thereof a threaded zone produced on one of an external or internal peripheral surface of the tubular component, depending on whether the end having the threaded zone is male or female in type, the process comprising:
    dissolving one or more mineral salts, which are not reactive towards the metals of the tubular component, in a solvent so as to form a solution;
    pre-heating the threaded zone of the tubular component;
    depositing the solution directly on at least a portion of a steel surface of the threaded zone after the pre-heating; and
    evaporating off the solvent to obtain a dry film having a crystalline mineral structure having a high specific surface area and which is not reactive towards the steel of the tubular component,
    wherein the specific surface area of the dry film having a crystalline mineral structure is more than 20 m$^2$/g,
    wherein the solution is an alkaline silicate dissolved in water, and
    wherein the pre-heating the threaded zone of the tubular component includes heating the threaded zone between 50° C. and 250° C. before depositing the solution.

2. The process for coating a galling-resistant steel tubular component according to claim 1, wherein the solution is deposited by spraying.

3. The process for coating a galling-resistant steel tubular component according to claim 1, wherein the solution is deposited by dipping.

4. The process for coating a galling-resistant steel tubular component according to claim 1, wherein the threaded zone is heated to between 50° C. and 300° C. after depositing the solution.

5. The process for coating a galling-resistant steel tubular component according to claim 1, wherein the solution is deposited at a temperature slightly below a boiling point thereof.

6. The process for coating a galling-resistant steel tubular component according to claim 1, wherein before depositing the solution, the solution is supplemented with an anticorrosion agent.

7. The process for coating a galling-resistant steel tubular component according to claim 1, wherein before depositing the solution, the solution is supplemented with a braking additive constituted by dispersions of mineral or organic particles which have a relatively high cleavage load value and/or strong particulate interactions or attractive bonds between particles and/or a medium to high Mohs hardness and/or a rheological behavior which is resistant to or opposes movement, each braking additive being selected from a group including bismuth oxide, titanium oxide, colloidal silica, and carbon black.

8. The process for coating a galling-resistant steel tubular component according to claim 1, wherein before depositing the solution, the solution is supplemented with nanometric mineral particles to increase frictional resistance of the dry film by adjusting a coefficient of friction thereof.

9. The process for coating a galling-resistant steel tubular component according to claim 8, wherein the nanometric mineral particles include at least one of alumina, silica, TiN.

10. The process for coating a galling-resistant steel tubular component according to claim 1, wherein before depositing the solution, the solution is supplemented with fullerene particles to increase frictional resistance of the dry film by reducing a coefficient of friction thereof.

11. The process for coating a galling-resistant steel tubular component according to claim 1, wherein before depositing the solution, the solution is supplemented with an organic dispersion/emulsion.

12. The process for coating a galling-resistant steel tubular component according to claim 1, wherein the threaded zone is coated with a lubricating system once the dry film has been formed.

13. The process for coating a galling-resistant steel tubular component according to claim 12, wherein the lubricating system is a hot-melt.

14. The process for coating a galling-resistant steel tubular component according to claim 1, wherein the specific surface area of the dry film having a crystalline mineral structure is more than 100 $m^2/g$.

15. The process for coating a galling-resistant steel tubular component according to claim 1, wherein the pre-heating the threaded zone of the tubular component includes heating the threaded zone between 120° C. and 250° C. before depositing the solution.

16. The process for coating a galling-resistant steel tubular component according to claim 1, wherein the evaporating off the solvent includes post-heating the threaded zone of the tubular component after depositing the solution.

17. The process for coating a galling-resistant steel tubular component according to claim 16, wherein the post-heating the threaded zone of the tubular component includes heating the threaded zone between 50° C. and 350° C. after depositing the solution.

18. A process for coating a galling-resistant steel tubular component made of one or more metals for drilling or operating hydrocarbon wells, the tubular component including at an end thereof a threaded zone produced on one of an external or internal peripheral surface of the tubular component, depending on whether the end having the threaded zone is male or female in type, the process comprising:
  dissolving one or more mineral salts, which are not reactive towards the metals of the tubular component, in a solvent so as to form a solution;
  pre-heating the threaded zone of the tubular component;
  depositing the solution directly on at least a portion of a steel surface of the threaded zone after the pre-heating; and
  evaporating off the solvent to obtain a dry film having a crystalline mineral structure having a high specific surface area and which is not reactive towards the steel of the tubular component,
  wherein the specific surface area of the dry film having a crystalline mineral structure is more than 20 $m^2/g$, and
  wherein the solution is an alkaline silicate dissolved in water.

* * * * *